United States Patent
Horiguchi et al.

(10) Patent No.: US 10,125,203 B2
(45) Date of Patent: Nov. 13, 2018

(54) POLYVINYL ALCOHOL POWDER AND METHOD FOR PRODUCING SAME

(71) Applicant: KURARAY CO., LTD., Kurashiki-shi (JP)

(72) Inventors: Junpei Horiguchi, Tainai (JP); Kazuyuki Tanaka, Tainai (JP); Junji Funakoshi, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/315,420

(22) PCT Filed: Jun. 3, 2015

(86) PCT No.: PCT/JP2015/066058
§ 371 (c)(1),
(2) Date: Dec. 1, 2016

(87) PCT Pub. No.: WO2015/186745
PCT Pub. Date: Dec. 10, 2015

(65) Prior Publication Data
US 2017/0190812 A1    Jul. 6, 2017

(30) Foreign Application Priority Data

Jun. 4, 2014 (JP) ................................. 2014-115417

(51) Int. Cl.
*C08F 116/06* (2006.01)
*C08J 3/12* (2006.01)
(Continued)

(52) U.S. Cl.
CPC ............. *C08F 116/06* (2013.01); *B01J 4/001* (2013.01); *B01J 19/242* (2013.01);
(Continued)

(58) Field of Classification Search
CPC ..................................................... C08F 116/06
See application file for complete search history.

(56) References Cited

U.S. PATENT DOCUMENTS

| 4,338,405 A | 7/1982 | Saxton |
| 5,811,488 A | 9/1998 | Narumoto et al. |

(Continued)

FOREIGN PATENT DOCUMENTS

| JP | 48-99290 A | 12/1973 |
| JP | 48-99752 A | 12/1973 |

(Continued)

OTHER PUBLICATIONS

Machine translation JP 2000-265026 (Year: 2000).*
(Continued)

*Primary Examiner* — Alexandre F Ferre
(74) *Attorney, Agent, or Firm* — Oblon, McClelland, Maier & Neustadt, L.L.P.

(57) ABSTRACT

The present invention is characterized by being a polyvinyl alcohol powder having an average particle diameter of 100 to 2000 μm as measured by optical microscopic observation at a humidity of 65% RH and a temperature of 25° C., having a bulk specific gravity (g/ml) of a portion ranging from 500 to 1000 μm in particle diameter of more than 0.60 and less than 0.80, and having a content of the portion ranging from 500 to 1000 μm in particle diameter of 35 to 70% by mass. Accordingly, a polyvinyl alcohol powder is provided, that is good in anti-scattering property, superior in solubility in preparing an aqueous solution from the powder, and capable of reducing transport costs due to its large specific gravity.

5 Claims, 3 Drawing Sheets (51) Int. Cl.
*C08F 16/06* (2006.01)
*C08F 8/12* (2006.01)
*B01J 19/24* (2006.01)
*B01J 4/00* (2006.01)

(52) U.S. Cl.
CPC ............ *B01J 19/2415* (2013.01); *C08F 8/12* (2013.01); *C08F 16/06* (2013.01); *C08J 3/12* (2013.01); *C08J 2329/04* (2013.01)

(56) References Cited

U.S. PATENT DOCUMENTS

| | | | |
|---|---|---|---|
| 2005/0059778 A1 | 3/2005 | Yanai et al. | |
| 2007/0100080 A1* | 5/2007 | Yun | B01J 19/02 525/330.6 |
| 2012/0329950 A1 | 12/2012 | Kozuka | |

FOREIGN PATENT DOCUMENTS

| | | | |
|---|---|---|---|
| JP | 57-121006 A | | 7/1982 |
| JP | 9-316272 A | | 12/1997 |
| JP | 2000265026 A | * | 9/2000 |
| JP | 2005-89606 A | | 4/2005 |
| JP | 2008-510880 A | | 4/2008 |
| JP | 2011-195672 A | | 10/2011 |
| JP | 2013-124317 A | | 6/2013 |
| JP | 2013-124318 A | | 6/2013 |
| JP | 2013-124319 A | | 6/2013 |
| WO | 2011/114575 A1 | | 9/2011 |

OTHER PUBLICATIONS

International Search Report dated Jun. 30, 2015 in PCT/JP2015/066058 filed Jun. 3, 2015.
Material Safe Data Sheet, prepared on Apr. 1, 1993, revised on Apr. 2, 2017 (6 pages).

* cited by examiner

POLYVINYL ALCOHOL POWDER AND METHOD FOR PRODUCING SAME

TECHNICAL FIELD

The present invention relates to a polyvinyl alcohol powder having a specific average particle diameter and a specific bulk specific gravity, and a method for producing the polyvinyl alcohol powder.

BACKGROUND ART

Polyvinyl alcohol is a synthetic resin prepared by saponifying a polyvinyl ester. It has the feature of being soluble in water and is used for such applications as a raw material for films, an emulsifying dispersant, and an adhesive as well as a raw material for synthetic fibers.

Polyvinyl alcohol is produced by a method in which a saponification reaction feed solution including a polyvinyl ester and an organic solvent is mixed with a saponification catalyst using a rotor mixer or a static mixer, then the mixed liquid is put on a belt type reactor, and a saponification reaction is made to proceed under a predetermined temperature condition. There have heretofore been proposed to use a "static" or "motionless" mixer for preliminary mixing in the saponification of a polyvinyl ester (see Patent Document 1) and to mix a saponification raw solution with a saponification catalyst using a static mixer, then put the mixture on a belt and make a saponification reaction proceed (see Patent Document 2).

PRIOR ART DOCUMENTS

Patent Documents

Patent Document 1: JP-A-57-121006
Patent Document 2: JP-A-2011-195672

SUMMARY OF THE INVENTION

Problems to be Solved by the Invention

However, polyvinyl alcohol powders prepared by the production methods disclosed in Patent Documents 1 and 2 are problematic in that a long time is needed for dissolution during the preparation of an aqueous solution, impairing the production efficiency. Moreover, there is another problem that the polyvinyl alcohol powders are small in bulk specific gravity and their wrapping bags are large in volume, resulting in high transport costs.

The present invention has been made in order to solve the above-mentioned problems, and an object thereof is to provide a polyvinyl alcohol powder that is good in anti-scattering property, superior in solubility in preparing an aqueous solution from the powder, and capable of reducing transport costs due to its large bulk specific gravity, and a method for producing the polyvinyl alcohol powder.

Means for Solving the Problems

As a result of earnest investigations, the present inventors have found that the above-mentioned problems can be solved by a polyvinyl alcohol powder having an average particle diameter within a specific range, having a bulk specific gravity of a portion ranging from 500 to 1000 μm in particle diameter being within a specific range, and having a content of the portion ranging from 500 to 1000 μm in particle diameter of 35 to 70% by mass, and a method for producing the polyvinyl alcohol powder, and thus completed the present invention.

That is, the present invention relates to:

[1] a polyvinyl alcohol powder having an average particle diameter of 100 to 2000 μm as measured by optical microscopic observation at a humidity of 65% RH and a temperature of 25° C., having a bulk specific gravity (g/ml) of a portion ranging from 500 to 1000 μm in particle diameter of more than 0.60 and less than 0.80, and having a content of the portion ranging from 500 to 1000 μm in particle diameter of 35 to 70% by mass;

[2] the polyvinyl alcohol powder according to [1] above, having a viscosity-average degree of polymerization of 200 to 5000 and a degree of saponification of 50 to 99.99 mol %; and

[3] a method for producing a polyvinyl alcohol powder, including: an introduction step of introducing a saponification catalyst into a central portion of a flow path in which a saponification raw solution including a polyvinyl ester and an organic solvent flows, and a mixing step of mixing the saponification raw solution with the introduced saponification catalyst using a static mixer at a shear rate of 5 to 90 s$^{-1}$.

Effects of the Invention

According to the present invention, there can be provided a polyvinyl alcohol powder that is good in anti-scattering property, superior in solubility, and large in bulk specific gravity. In accordance with the production method of the present invention, it is possible to produce such a superior polyvinyl alcohol powder easily.

MODES FOR CARRYING OUT THE INVENTION

The polyvinyl alcohol (hereinafter sometimes abbreviated as "PVA") powder of the present invention has an average particle diameter of 100 to 2000 as measured by optical microscopic observation at a humidity of 65% RH and a temperature of 25° C., has a bulk specific gravity (g/ml) of a portion ranging from 500 to 1000 μm in particle diameter of more than 0.60 and less than 0.80, and has a content of the portion ranging from 500 to 1000 μm in particle diameter of 35 to 70% by mass. Since such a PVA powder of the present invention is characteristic in being good in anti-scattering property, superior in solubility, and larger in bulk specific gravity than conventional PVA powders, the PVA powder can be loaded in a large amount per unit volume, and therefore can reduce transport costs. Hereinafter, detailed description is given about the PVA powder of the present invention and a method for producing the PVA powder.

The average particle diameter of the PVA powder of the present invention as measured by optical microscopic observation at a humidity of 65% RH and a temperature of 25° C. is 100 to 2000 μm. If the average particle diameter is smaller than 100 then the PVA fine powder is liable to scatter, and deteriorates in handling property. The average particle diameter is preferably 300 μm or more, and more preferably 500 μm or more. On the other hand, if the average particle diameter is larger than 2000 the PVA powder deteriorates in solubility in water, and therefore a long time is needed for preparation of a solution of the PVA powder. The average particle diameter is preferably 1500 μm or less, and more preferably 1000 μm or less. The average particle diameter of a PVA powder denotes the value of the length of the major axis measured by optical microscopic observation using a digital microscope.

In the case where the PVA powder of the present invention having an average particle diameter of 100 to 2000 μm as measured by optical microscopic observation at a humidity 65% RH and a temperature of 25° C. is sieved using sieves (each having a mesh size of 500 μm or 1000 μm), the bulk specific gravity (g/ml) of a portion ranging from 500 to 1000 μm in particle diameter (a portion of the PVA powder capable of passing through a sieve having a mesh size of 1000 μm but incapable of passing through a sieve having a mesh size of 500 μm) is more than 0.60 and less than 0.80. If the bulk specific gravity is less than 0.60, the solubility in water will deteriorate and transport costs will increase. The bulk specific gravity is preferably 0.61 or more, and more preferably 0.62 or more. If the bulk specific gravity is less than 0.60, the solubility in water will deteriorate and transport costs will increase. On the other hand, a PVA powder having a bulk specific gravity more than 0.80 is difficult to produce. The bulk specific gravity is preferably 0.75 or less, more preferably 0.70 or less, and even more preferably 0.65 or less. The bulk specific gravity of the PVA powder of the present invention denotes a value measured by a method according to JIS K6720-2.

As to the particle size distribution of the PVA powder of the present invention, the percentage of the portion ranging from 500 to 1000 μm in particle diameter is the largest, specifically, the percentage is 35 to 70% by mass. As defined in examples described below, the percentage of the portion ranging from 500 to 1000 μm in particle diameter is a percentage (% by mass) relative to the sum total (100% by mass) of the particle size distribution divided into five portions. Since the percentage of the portion ranging from 500 to 1000 μm in particle diameter is within the above-mentioned range, the effect of the present invention is exhibited more remarkably, and the scattering of the PVA fine powder into the air can be suppressed. The percentage of the portion ranging from 500 to 1000 μm in particle diameter is preferably 38% by mass or more, and more preferably 40% by mass or more. On the other hand, the percentage of the portion ranging from 500 to 1000 μm in particle diameter is preferably 65% by mass or less, and more preferably 60% by mass or less.

The viscosity-average degree of polymerization of the PVA to be used in the present invention is preferably 200 to 5000. Since the viscosity-average degree of polymerization is within the above-mentioned range, solubility in water is good and industrial production is easy. The viscosity-average degree of polymerization is preferably 250 or more, and more preferably 400 or more. On the other hand, the viscosity-average degree of polymerization is preferably 4500 or less, and more preferably 3500 or less. The viscosity-average degree of polymerization of the PVA to be used in the present invention is measured according to JIS K6726. That is, the viscosity-average degree of polymerization can be calculated using the following equation from a limiting viscosity [η] (unit: liter/g) measured in water at 30° C. after re-saponifying PVA to a degree of saponification of 99.5 mol % or more and purifying the product.

$$P=([\eta]\times 10000/8.29)^{(1/0.62)}$$

The degree of saponification of the PVA to be used in the present invention is preferably 50 to 99.99 mol %. It is preferred that the degree of saponification is within the above-mentioned range, as such PVA is good in solubility in water and can be produced stably. The degree of saponification is more preferably 60 mol % or more, and even more preferably 70 mol % or more. On the other hand, the degree of saponification is more preferably 99.8 mol % or less, and even more preferably 99.7 mol % or less. The degree of saponification of the PVA to be used in the present invention is measured according to JIS K6726.

Hereinafter, a method for producing the PVA powder of the present invention is described in detail. It is noted that the present invention is not limited to the production method described below. For example, the PVA to be used in the present invention can be yielded by performing mixing using a static mixer in the step of saponifying a polyvinyl ester, a precursor of the PVA, and performing a saponification reaction under specific conditions.

The PVA to be used in the present invention can be produced, for example, by polymerizing a vinyl ester by a conventional method known in the art, such as a bulk polymerization method, a solution polymerization method, a suspension polymerization method, an emulsion polymerization method, or a dispersion polymerization method, and then saponifying the resulting polyvinyl ester. Polymerization methods preferable from an industrial point of view are a solution polymerization method, an emulsion polymerization method, and a dispersion polymerization method. In polymerization operations, any polymerization system of a batch process, a semi-batch process, and a continuous process can be employed.

Examples of a vinyl ester which can be used for the polymerization include vinyl acetate, vinyl formate, vinyl propionate, vinyl caprylate, and vinyl versatate; of these, vinyl acetate is preferred from an industrial point of view.

In the polymerization of the vinyl ester, the vinyl ester may be copolymerized with other monomers as long as the effect of the present invention is not impaired. Examples of other monomers which can be used include α-olefins such as ethylene, propylene, n-butene, and isobutylene; acrylic acid and salts thereof; acrylic esters; methacrylic acid and salts thereof; methacrylic esters; acrylamide; acrylamide derivatives such as N-methylacrylamide, N-ethylacrylamide, N,N-dimethylacrylamide, diacetone acrylamide, acrylamidopropanesulfonic acid and salts thereof, acrylamidopropyldimethylamine, and salts thereof or quaternary salts thereof, and N-methylolacrylamide and derivatives thereof; methacrylamide; methacrylamide derivatives such as N-methylmethacrylamide, N-ethylmethacrylamide, methacrylamidopropanesulfonic acid and salts thereof, methacrylamidopropyldimethylamine, and salts thereof or quaternary salts thereof, and N-methylolmethacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; unsaturated dicarboxylic acids such as maleic acid, itaconic acid, and fumaric acid, and salts thereof or esters thereof; vinylsilyl compounds such as vinyltrimethoxysilane; and isopropenyl acetate.

In the polymerization of the vinyl ester, a chain transfer agent may be made to coexist for the purpose of regulating the degree of polymerization of the PVA to be obtained, for example. Examples of the chain transfer agent include aldehydes such as acetaldehyde, propionaldehyde, butyl aldehyde, and benzaldehyde; ketones such as acetone, methyl ethyl ketone, hexanone, and cyclohexanone; mercaptans such as 2-hydroxyethanethiol; thiocarboxylic acids such as thioacetic acid; and halogenated hydrocarbons such as trichloroethylene and perchloroethylene; of these, aldehydes and ketones are suitably used. Although the amount of the chain transfer agent to be added is determined according to the chain transfer constant of the chain transfer agent and the desired degree of polymerization of the PVA, generally, the amount is desirably 0.1 to 10% by mass relative to the vinyl ester to be used.

As the saponification reaction of the polyvinyl ester, it is possible to employ an alcoholysis or hydrolysis reaction using a conventionally known basic catalyst such as sodium hydroxide, potassium hydroxide, and sodium methoxide, or an acidic catalyst such as p-toluenesulfonic acid. Examples of the solvent to be used for the saponification reaction include alcohols such as methanol and ethanol; esters such as methyl acetate and ethyl acetate; ketones such as acetone and methyl ethyl ketone; and aromatic hydrocarbons such as benzene and toluene; these may be used individually or two or more of them may be used in combination. In particular, it is convenient and therefore preferable to perform the saponification reaction in the presence of sodium hydroxide, which is a basic catalyst, using methanol or a mixed solution of methanol with methyl acetate as a solvent.

Figure 1:
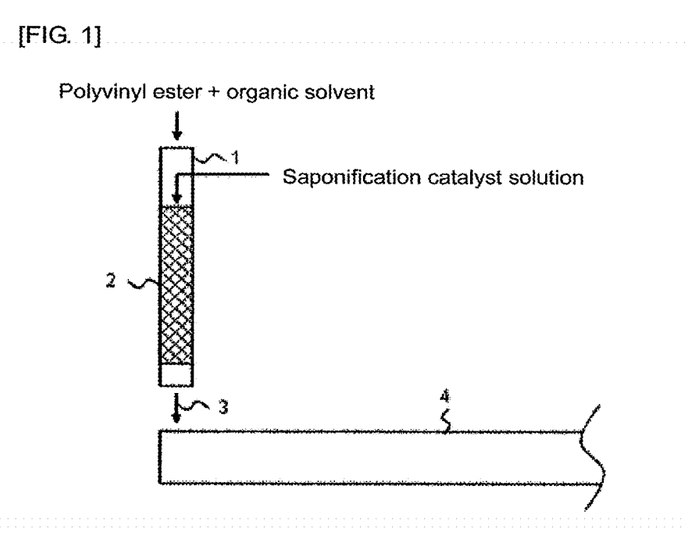
FIG. 1 is a diagram schematically illustrating a configuration of a saponification apparatus to be used in a method for producing a polyvinyl alcohol powder according to an embodiment of the present invention.
Figure 2:
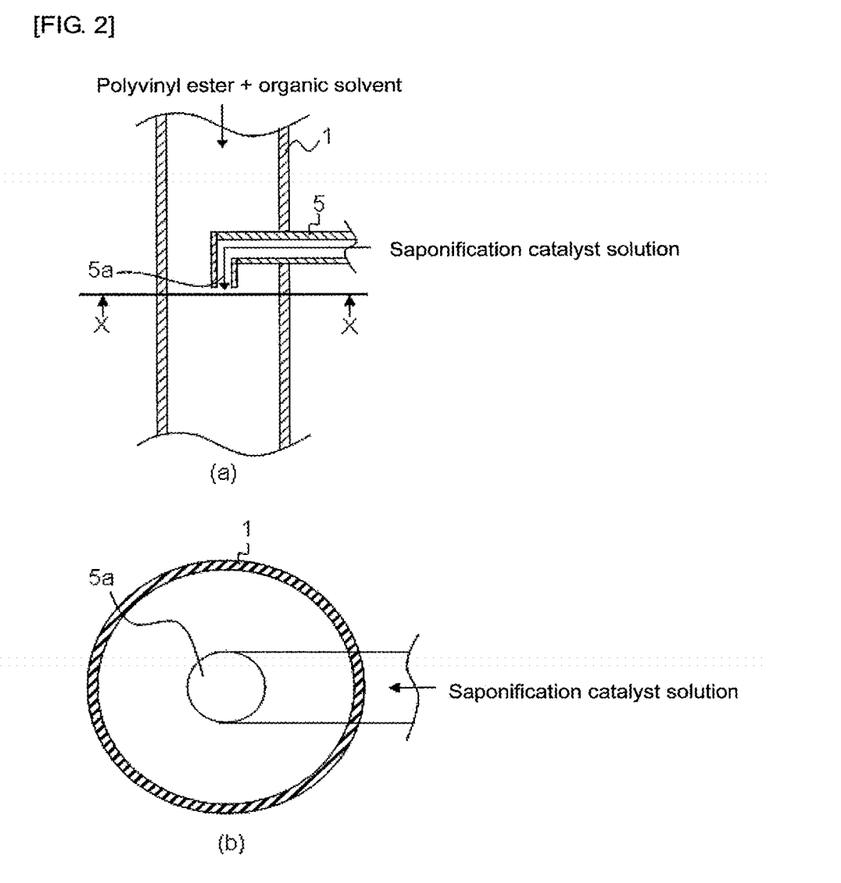
FIG. 2(a) is a cross-sectional view illustrating a configuration example of a catalyst introduction mechanism of the saponification apparatus depicted in FIG. 1.
FIG. 2(b) is a cross-sectional view taken along the line X-X shown in FIG. 2(a).

FIG. 1 is a diagram schematically illustrating a configuration of a saponification apparatus to be used in a method for producing a PVA powder of this embodiment. FIG. 2($a$) is a cross-sectional view illustrating a configuration example of a catalyst introduction mechanism of the saponification apparatus, and FIG. 2($b$) is a cross-sectional view taken along the line X-X shown in FIG. 2($a$). In the method for producing a PVA powder of this embodiment, a saponification raw solution including the polyvinyl ester prepared in the polymerization step and an organic solvent is made to flow in a flow path 1, and a solution containing a saponification catalyst is introduced into a central portion of the flow path 1 as depicted, for example, in FIGS. 1 and 2. Then, these solutions are mixed using a static mixer 2, and then the mixture is put on a belt or the like, and a saponification reaction is promoted. The static mixer 2 is constituted of elements having inside plate-like baffles engaging and crossing with each other, and the flow of a solution is divided into many stages by the baffles within the elements and thereby the solution is mixed. Thus, the shear rate applied when a viscous liquid passes through the baffles within the elements greatly influences the mixed state. However, it is difficult to measure or control the shear rate at the time the viscous liquid passes through the baffles within the elements. Thus, in the present application, in a pipe of the static mixer, the shear rate within the pipe immediately before a viscous liquid passes through the baffles is controlled so that the state of the mixture within the elements is regulated.

At this time, the viscosity of the saponification raw solution is preferably adjusted to 0.01 to 30 Pa·s. It is preferable to adjust the viscosity of the saponification raw solution within the above-mentioned range because this makes the transfer of the solution easy and reduces the production cost.

Moreover, the polyvinyl ester concentration in the saponification raw solution is preferably adjusted to 20 to 60% by mass. It is preferable to adjust the polyvinyl ester concentration within the above-mentioned range because this makes the transfer easy and reduces the production cost.

On the other hand, the saponification catalyst concentration in the saponification catalyst solution is preferably adjusted to 0.2 to 10% by mass. Adjusting the saponification catalyst concentration within the above-mentioned range is preferable because this makes a saponification reaction proceed at a moderate reaction rate.

Examples of the method for introducing a saponification catalyst solution into the central portion of the flow path 1 in which the saponification raw solution flows include a method in which a saponification catalyst introduction tube 5 with an introduction port 5$a$ is made penetrate the flow path 1 along a direction perpendicular to the flow direction of the flow path 1 and the introduction port 5$a$ is disposed at a central portion of the flow path 1 to face the downstream of the flow direction as depicted in FIG. 2. The purpose of making the saponification catalyst introduction tube 5 penetrate the flow path 1 is to equalize the flow rate as much as possible at every position on a cross section of the flow path 1 perpendicular to the flow direction and thereby suppress disruption of the flow of the saponification raw solution as small as possible.

The purpose of introducing the saponification catalyst solution into a central portion of the flow path 1 is to improve the mixing efficiency. In the case where the saponification catalyst solution is introduced into a position deviating from the central portion of the flow path 1, variation in concentration will occur at every position on the cross section perpendicular to the flow direction. The size of the introduction port 5$a$ is not particularly limited, and is desirably 0.05 to 0.5 times the diameter of the flow path 1. Making the catalyst introduction mechanism to have such a configuration makes it possible to suppress disruption of the flow of the saponification raw solution and mix the raw materials efficiently.

The method for introducing the saponification catalyst solution is not limited to the method illustrated in FIG. 2 and can be suitably chosen according to the equipment configuration, for example. For example, the saponification catalyst introduction tube 5 can be an L-shaped cantilever or can be in a cross shape, at the center of which the introduction port 5$a$ can be disposed.

The type and the number of the elements of the static mixer 2 are not particularly limited, and can be suitably chosen according to conditions, such as the flow rate, flow velocity, and concentration. In that case, it is preferred to use as the static mixer 2 a mixer having a pressure loss per element of less than 0.05 MPa. This makes it possible to dispose a plurality of elements without using an expensive pump having a high allowable pressure, and therefore a good mixed state can be achieved with a smaller energy than before by utilizing existing equipment.

It is more preferred that the pressure loss per element of the static mixer 2 is less than 0.03 MPa, and this can increase the number of static mixers 2 to be disposed and, therefore, can increase the degree of mixing. If an increased number (element number) of static mixers 2 are disposed, the degree of mixing will increase and the pressure loss will also increase; therefore, it is desirable to choose a diameter according to the allowable pressure of a raw material feeding pump or feeding pipe.

In the production method of the present invention, the saponification raw solution is mixed with the introduced saponification catalyst at a shear rate of 5 to 90 $s^{-1}$ using such a static mixer 2. If the shear rate is less than 5 $s^{-1}$, then the saponification raw solution and the saponification catalyst are not fully mixed and a saponification reaction does not fully proceed. The shear rate is preferably 6 $s^{-1}$ or more, and more preferably 7 $s^{-1}$ or more. On the other hand, if the shear rate is greater than 90 $s^{-1}$, there is a tendency that the bulk specific gravity of the PVA powder to be obtained reduces. The shear rate is preferably 70 $s^{-1}$ or less, and more preferably 50 $s^{-1}$ or less. The shear rate represents a value measured by the method described in the examples described below.

The mixture obtained by mixing with the static mixer 2 is held under a predetermined temperature condition for a predetermined period of time, and thereby a saponification reaction is made to proceed. For example, the mixture is held under a temperature condition of 20 to 50° C. while the belt is moved. The holding time at this time can be determined according to the targeted degree of saponification; for example, when the average degree of saponification is intended to be about 90 mol %, the mixture can be held for about 30 minutes. The present invention is not limited to an embodiment in which a belt type reactor is used, and can be applied not only to the belt type reactor but also to, for example, a kneader type reactor or a tower type reactor.

By this saponification step, part or all of the vinyl ester units in the polyvinyl ester are saponified into vinyl alcohol units. The degree of saponification of the PVA to be yielded by the saponification step described above is not particularly limited, and can be determined suitably according to the intended application, for example.

In the method for producing a PVA powder of the present invention, a pulverization step and a drying step may also be performed after the polymerization step and the saponification step, both described above, are performed. Moreover, the pulverization step may be divided into a preliminary pulverization step and a main pulverization step. The PVA resulting from the saponification step is prepared such that its average particle diameter after the removal of a solvent in the preliminary pulverization step before drying or the main pulverization step after drying may fall into the above-mentioned range, so that the PVA turns into the PVA powder of the present invention. The pulverizing apparatus to be used in the present invention is not particularly limited as long as the pulverizing apparatus is capable of appropriately attaining the average particle diameter defined in the present invention and the preferable particle size distribution by the rotation speed of the pulverizer, for example. In the method for producing the PVA powder of the present invention, a washing step for removing impurities, such as sodium acetate, may further be performed as necessary.

Figure 3:
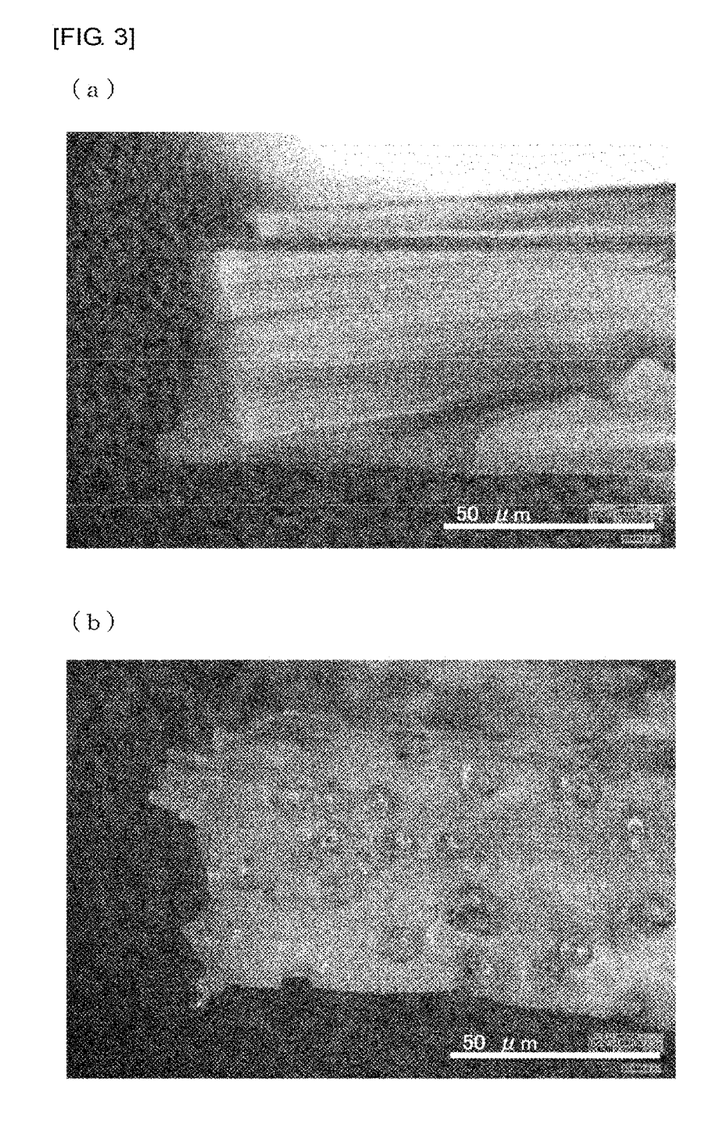
FIG. 3(a) is a photograph obtained by observing a surface condition of the polyvinyl alcohol powder of Example 1 with an optical microscope after preliminary pulverization.
FIG. 3(b) is a photograph obtained by observing a surface condition of the polyvinyl alcohol powder of Comparative Example 1 with an optical microscope after preliminary pulverization.

FIG. 3(a) is a photograph obtained by observing a surface of the PVA powder of Example 1 with an optical microscope after preliminary pulverization, and FIG. 3(b) is a photograph obtained by observing a surface of the PVA powder of Comparative Example 1 with an optical microscope after preliminary pulverization. The PVA powder of this embodiment has almost no bubbles at the inside and the surface of the PVA powder as depicted in FIG. 3(a) for Example 1, for example. Conversely, conventional PVA powders have many bubbles at the inside and the surface of the PVA powders as depicted in FIG. 3(b) for Comparative Example 1. Generally, in preparing an aqueous solution by dissolving a PVA powder in water, the smaller the average particle diameter is, the more rapidly the vicinity of the PVA surface is dissolved and the more easily aggregates are formed. The aggregates come into a state where they enclose water therein; therefore, the aggregates are not dissolved easily even if heated, and it thereafter becomes difficult to prepare an aqueous PVA solution. For this reason, it is desirable that the average particle diameter of a PVA powder is large in order to avoid the formation of the aggregates. However, conventional methods for producing a PVA powder are problematic in that PVA powders which are large in average particle diameter are small in bulk specific gravity because many bubbles are present at the inside and the surface of the PVA powders as depicted in FIG. 3(b). On the other hand, the PVA powder of this embodiment contains almost no bubbles at the inside and the surface of the PVA powder. Moreover, a PVA powder excelling in solubility at the time of preparing an aqueous solution from the powder and being large in bulk specific gravity can be afforded by regulating the bulk specific gravity of a portion within a specific range and having an average particle diameter within a specific range.

As described in detail above, in the method for producing the PVA powder of the present invention, the PVA powder of the present invention can be produced easily by introducing a saponification raw solution and a saponification catalyst solution by a specific method and then mixing them using a static mixer at a shear rate within a specific range. Since static mixers do not generate mixing heat, no saponification reaction proceeds during the mixing. For this reason, the quality of the PVA powder to be produced can be stabilized.

EXAMPLES

Hereinafter, the effects of the present invention are explained concretely with reference to examples and comparative examples of the present invention. In the following examples and comparative examples, "part" and "%" are on mass basis unless otherwise stated.

[Measurement of Shear Rate]

In the production methods of examples and comparative examples, the shear rate is determined by the following equation from the feed amount ($m^3/s$) of a polyvinyl acetate (hereinafter sometimes abbreviated as "PVAc") solution, the cross-sectional area ($m^2$) of a static mixer, and the diameter (m) of a static mixer. The shear rate can be controlled by changing the diameter of a static mixer.

Shear rate ($s^{-1}$)=(feed amount of PVAc solution)/
[(cross-sectional area of static mixer)×(diameter of static mixer)]

[Measurement of Average Particle Diameter of PVA Powder]

Each of the PVA powders used in examples and comparative examples was left to stand for 24 hours under conditions including a humidity of 65% RH and a temperature of 25° C. Subsequently, a photograph was taken using an optical microscope (Digital Microscope KH-7700; manufactured by HIROX Co., Ltd.). In the photograph, fifty particles of the PVA powder were selected randomly and their major axes were measured, and the average value of the measured major axes was taken as an average particle diameter (μm). PVA fine particles smaller than 20 μm were excluded from measurement because they were indistinguishable from contrast irregularities of the photograph.

[Measurement of Particle Size Distribution of PVA Powder]

For 300 g of a PVA powder used in examples and comparative examples, sieving was performed using four sieves differing in mesh size (mesh size: 250 μm, 500 μm, 1000 μm, 1180 μm). The mass of PVA powders having the individual measured particle diameters was measured and the percentage by mass of the individual powders was calculated.

[Measurement of Bulk Specific Gravity of PVA]

For the PVA powders used in examples and comparative examples and the PVA sieved into particle diameters of 500 to 1000 μm, a bulk specific gravity was measured by the method according to JIS K6720-2.

[Evaluation of Solubility of PVA Powder]

Under stirring the inside of a flask containing 288 g of distilled water at a temperature of 20° C. using a semicircular stirring blade, each 12 g of the PVA powders used in examples and comparative examples (those having been sieved into particle diameters of 500 to 1000 μm) were added, thereby preparing slurry. Then, the flask was heated at a rate of 0.9° C./minute, and an aqueous PVA solution was taken immediately after the temperature of the slurry reached 30° C. Subsequently, the concentration of PVA (solubility %) was measured, and the amount of the PVA dissolved during this course was thereby calculated and was evaluated in accordance with the following criteria. The results are shown in Table 2.

A: 60% by mass or more
B: 55% by mass or more but less than 60% by mass
C: 50% by mass or more but less than 55% by mass
D: less than 50% by mass

[Evaluation of Scattering Property of PVA Powder]

An acrylic cylindrical container 5 cm in inner diameter and 1 m in height is stood perpendicularly, and 100 g a PVA powder is allowed to free-fall from the top of the cylinder. The fine powder that rose after the dropping was observed visually, and was evaluated in accordance with the following criteria. The results are shown in Table 2.

A: There is almost no rise.
B: There is a little rise.
C: There is much rise.

Example 1

A methanol solution of polyvinyl acetate (PVAc) (concentration: 32% by mass), a saponification raw solution, was fed at a rate of 4700 L/h (=1.31×10$^{-3}$ m$^3$/s) and a methanol solution of sodium hydroxide (concentration: 4% by mass), a saponification catalyst solution, was fed at a rate of 165 L/h into the central portion of a flow path depicted in FIG. 2. The fed saponification raw solution and the fed saponification catalyst solution were mixed under conditions of a shear rate of 10.6 s$^{-1}$ by using a static mixer having 22 elements (the pressure loss per element was 0.035 MPa). The resulting mixture was put on a belt and was held under a temperature condition of 40° C. for 18 minutes, so that a saponification reaction was made to proceed. Then, preliminary pulverization, drying, and main pulverization were performed, and the material was sieved through a 12 mesh sieve (JIS standard) at the outlet of the pulverizer for the main pulverization, affording a PVA powder of the present invention. The resulting PVA had a viscosity-average degree of polymerization of 2400 and a degree of saponification of 88.3 mol %. The analysis results of the resulting PVA are shown in Table 2.

Examples 2 to 6 and Comparative Examples 1 to 3

Operations were performed in the same manner as in Example 1 except that the production conditions of the saponification reaction and the pulverization were changed as shown in Table 1, affording the PVA powders of Examples 2 to 6 and Comparative Examples 1 to 3. The analysis results of the resulting PVA are shown in Table 2.

Comparative Example 4

Operations were performed in the same manner as in Example 1 except that the conditions of the saponification reaction were changed as shown in Table 1. As a result, a saponification reaction occurred in a heterogeneous mixed solution state and no homogeneous PVA powder was obtained.

TABLE 1

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| (Introduction step) |  |  |  |  |  |  |  |  |  |  |
| Feed amount (L/h) of PVAc solution | 4700 | 4700 | 4700 | 4700 | 4700 | 4700 | 4700 | 4700 | 4700 | 4700 |
| Concentration (%) of PVAc solution | 32 | 32 | 32 | 32 | 32 | 32 | 32 | 32 | 32 | 32 |
| Solution feed amount (L/h) of saponification catalyst solution | 165 | 165 | 165 | 165 | 165 | 165 | 165 | 165 | 165 | 165 |
| Concentration (%) of saponification catalyst solution | 4 | 4 | 4 | 4 | 4 | 8 | 4 | 4 | 4 | 4 |
| (Mixing step) |  |  |  |  |  |  |  |  |  |  |
| Type of mixer | Static mixer | Static mixer | Static mixer | Static mixer | Static mixer | Static mixer | Rotor Mixer | Static mixer | Static mixer | Static mixer |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Number of elements (element(s)) | 22 | 22 | 22 | 30 | 22 | 22 | — | 22 | 22 | 22 |
| Shear rate ($s^{-1}$) (Pulverization step) | 10.6 | 50 | 80 | 9 | 10.6 | 10.6 | — | 350 | 350 | 4 |
| Size (mesh) of sieve at pulverizer outlet | 12 | 12 | 12 | 12 | 14 | 12 | 12 | 12 | 12 | 12 |

TABLE 2

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Viscosity-average degree of polymerization | | 2400 | 1700 | 2400 | 2400 | 2400 | 2400 | 2400 | 2400 | 2400 |
| Degree of saponification (mol %) | | 88.3 | 88.5 | 88.0 | 88.0 | 88.2 | 98.5 | 88.0 | 88.0 | 88.1 |
| Particle size distribution | less than 250 μm (% by mass) | 11.8 | 12.4 | 11.7 | 12.0 | 21.0 | 13.1 | 8.6 | 10.2 | 32.0 |
|  | 250 to 500 μm (% by mass) | 29.4 | 30.1 | 29.7 | 29.7 | 30.2 | 32.5 | 22.3 | 28.3 | 33.5 |
|  | 500 to 1000 μm (% by mass) | 46.1 | 45.4 | 46.3 | 45.9 | 39.8 | 48.2 | 48.9 | 47.5 | 34.2 |
|  | 1000 to 1180 μm (% by mass) | 9.3 | 9.1 | 9.1 | 9.2 | 8.8 | 5.5 | 14.3 | 10.2 | 0.3 |
|  | more than 1180 μm (% by mass) | 3.4 | 3.0 | 3.2 | 3.2 | 0.2 | 0.7 | 5.9 | 3.8 | 0.0 |
| Average particle diameter (μm) | | 594 | 584 | 591 | 590 | 522 | 598 | 675 | 613 | 416 |
| Bulk specific gravity (g/ml) of portion ranging from 500 to 1000 μm | | 0.62 | 0.62 | 0.61 | 0.65 | 0.61 | 0.63 | 0.60 | 0.59 | 0.61 |
| Bulk specific gravity (g/ml) of PVA | | 0.62 | 0.62 | 0.61 | 0.65 | 0.62 | 0.63 | 0.59 | 0.59 | 0.63 |
| Evaluation of solubility | | A | A | B | A | A | A | D | C | A |
| Evaluation of anti-scattering property | | A | A | A | A | B | A | A | A | C |

The above results show that a good anti-scattering property can be achieved by introducing a saponification catalyst into a central portion of a flow path in which a saponification raw solution including a methanol solution of polyvinyl acetate flows, and then mixing the saponification raw solution with the saponification catalyst at a shear rate of 5 to 90 $s^{-1}$ using a static mixer, and the resulting PVA powders are superior in solubility in water and large in bulk specific gravity, and therefore transport costs can be reduced. Such a PVA powder of the present invention is useful as various binders, paper processing agents, textile processing agents, stabilizers for emulsions and so on, and a raw material for PVA-based films and PVA-based fibers.

REFERENCE SIGNS LIST

1: Flow path
2: Static mixer
3: Mixture of saponification raw solution and saponification catalyst
4: Belt type reactor
5: Saponification catalyst introduction tube
5a: Saponification catalyst solution

The invention claimed is:

1. A poly vinyl alcohol powder having an average particle diameter of 100 to 2000 μm as measured by optical microscopic observation at a humidity of 65% RH and a temperature of 25° C., having a bulk specific gravity (g/ml) of a portion ranging from 500 to 1000 μm in particle diameter of more than 0.60 and less than 0.80, and having a content of the portion ranging from 500 to 1000 μm in particle diameter of 35 to 70% by mass.

2. The polyvinyl alcohol powder according to claim 1, having a viscosity-average degree of polymerization of 200 to 5000 and a degree of saponification of 50 to 99.99 mol %.

3. The poly vinyl alcohol powder according to claim 1, wherein the bulk specific gravity (g/ml) of the portion ranging from 500 to 1000 μm in particle diameter is 0.62 or more.

4. The polyvinyl alcohol powder according to claim 1, wherein the content of the portion ranging from 500 to 1000 μm in particle diameter is 40% by mass or more.

5. A method for producing the polyvinyl alcohol powder of claim 1, comprising:
an introduction step of introducing a saponification catalyst into a central portion of a flow path in which a saponification raw solution comprising a polyvinyl ester and an organic solvent flows, and
a mixing step of mixing the saponification raw solution with the introduced saponification catalyst using a static mixer at a shear rate of 5 to 90 $s^{-1}$.

* * * * *